(12) United States Patent
Hjort et al.

(10) Patent No.: US 9,239,249 B2
(45) Date of Patent: Jan. 19, 2016

(54) OPTICAL FIBER GRATING SENSOR SYSTEM AND METHOD COMPRISING PLURAL OPTICAL GRATINGS HAVING PARTIALLY OVERLAPPING OPERATING RANGES

(71) Applicant: VESTAS WIND SYSTEMS A/S, Aarhus N (DK)

(72) Inventors: Thomas Hjort, Vejle Øst (DK); Lars Glavind, Randers C (DK)

(73) Assignee: Vestas Wind Systems A/S, Aarhus N. (DK)

( * ) Notice: Subject to any disclaimer, the term of this patent is extended or adjusted under 35 U.S.C. 154(b) by 85 days.

(21) Appl. No.: 14/347,976

(22) PCT Filed: Sep. 19, 2012

(86) PCT No.: PCT/DK2012/050345
§ 371 (c)(1),
(2) Date: Mar. 27, 2014

(87) PCT Pub. No.: WO2013/044919
PCT Pub. Date: Apr. 4, 2013

(65) Prior Publication Data
US 2014/0239166 A1    Aug. 28, 2014

Related U.S. Application Data

(60) Provisional application No. 61/541,134, filed on Sep. 30, 2011.

(30) Foreign Application Priority Data

Sep. 30, 2011    (DK) .................................. 2011 70542

(51) Int. Cl.
*G01J 1/04* (2006.01)
*G01D 5/353* (2006.01)

(Continued)

(52) U.S. Cl.
CPC .......... *G01D 5/3537* (2013.01); *G01D 5/35303* (2013.01); *G01D 5/35316* (2013.01);
(Continued)

(58) Field of Classification Search
CPC ....... G01L 1/246; G01L 19/04; G01L 9/0077; G01D 5/35303; G01D 5/35316; G01K 11/3206; G01J 3/0218
USPC .................... 250/227.11–227.25, 214.1, 239; 385/11, 12, 13, 15, 31, 37
See application file for complete search history.

(56) References Cited

U.S. PATENT DOCUMENTS 5,426,297 A * 6/1995 Dunphy et al. .......... 250/227.23
7,697,121 B1    4/2010 Coroy et al.

(Continued)

FOREIGN PATENT DOCUMENTS

DE    102008014644 A1    10/2009
GB         2348000 A     9/2000

(Continued)

OTHER PUBLICATIONS

International Search Report for PCT/DK2012/050345, Jan. 3, 2013.

(Continued)

*Primary Examiner* — Que T Le
(74) *Attorney, Agent, or Firm* — Patterson & Sheridan, LLP (57) ABSTRACT

The present invention relates to an optical fiber for a fiber optic sensor, comprising a first optical grating adapted to operate over a first range of wavelengths; and at least one set of further gratings adapted to operate over a second range of wavelengths, each grating being adapted to operate over a portion of the second range; wherein, each grating within said set has an operating range that partially overlaps with at least one other such grating operating range. The invention also extends to a sensor system, and method, using such an optical fiber.

26 Claims, 6 Drawing Sheets

(51) Int. Cl.
- *G01M 5/00* (2006.01)
- *G01M 11/08* (2006.01)
- *G01K 11/32* (2006.01)
- *G01L 1/24* (2006.01)

(52) U.S. Cl.
CPC ........ *G01D5/35341* (2013.01); *G01D 5/35387* (2013.01); *G01K 11/3206* (2013.01); *G01L 1/246* (2013.01); *G01M 5/0016* (2013.01); *G01M 5/0091* (2013.01); *G01M 11/083* (2013.01)

(56) References Cited

U.S. PATENT DOCUMENTS

| | | |
|---|---|---|
| 2002/0176647 A1 | 11/2002 | Spirin et al. |
| 2005/0269489 A1 | 12/2005 | Taverner |
| 2006/0076476 A1 | 4/2006 | Thingbo et al. |
| 2008/0142693 A1 | 6/2008 | Kojima |
| 2010/0303403 A1 | 12/2010 | Homa et al. |

FOREIGN PATENT DOCUMENTS

| | | |
|---|---|---|
| GB | 2372100 A | 8/2002 |
| GB | 2402479 A | 12/2004 |
| GB | 2440954 A | 2/2008 |
| JP | 2000346722 A | 12/2000 |
| JP | 2004145382 A | 5/2004 |
| WO | 03/076887 A1 | 9/2003 |
| WO | 2006/107277 A1 | 10/2006 |
| WO | 2006/107278 A1 | 10/2006 |
| WO | 2007/139262 A1 | 12/2007 |

OTHER PUBLICATIONS

Danish Search Report for PA 2011 70542, May 9, 2012.

* cited by examiner

OPTICAL FIBER GRATING SENSOR SYSTEM AND METHOD COMPRISING PLURAL OPTICAL GRATINGS HAVING PARTIALLY OVERLAPPING OPERATING RANGES

BACKGROUND OF THE INVENTION

The invention relates to an optical fibre grating sensor system and to a method for increasing the number of measurement sites in such a system. In particular, the invention relates to a system and method using Fibre Bragg (FBG) or Long Period Fibre (LPG) Gratings, and contemplates the use of the system applied to a wind turbine power plant.

Wind turbine components are subject to temperature variation from a number of sources, such as environmental temperature change, and heat generated in components. Consequently, it is important that the temperature of those components is monitored to ensure that they are operating within appropriate ranges.

In addition, wind turbine components are subject to deformation or strain from a number of sources, such as the accumulation of particulates like dirt or ice, their own weight, and the force exerted by the wind itself. Consequently, it is important that the strain on components be monitored to ensure that they remain fit to operate over their intended working lives.

An FBG sensor is an optical fibre in which an optical grating is formed. The grating itself is typically a periodic variation in the refractive index of the fibre, tuned to reflect a particular wavelength of light. The region of the optical fibre having the grating is then attached to the region of the wind turbine component where an operating condition such as temperature or strain is to be measured. It is attached in such a way that any deformation, strain or temperature change experienced by the component is transmitted to the fibre and to the grating. Temperature variation, deformation and strain causes the spacing and the refractive index of the grating to change, and causes a detectable change in the wavelength of light reflected back or transmitted by the grating. Various arrangements are known for inserting light into the FBG sensors and for extracting and analysing the output.

Long Period Fibre Gratings operate in a similar manner to FBGs but instead couple light of particular wavelengths travelling in the core to the cladding where it is subsequently lost due to absorption or scattering.

A number of techniques for mounting fibre optic sensors on wind turbine components are known, such as attaching the fibre optic cable by means of brackets, or hollow casings, or locating the sensor within a capillary tube that can be embedded, tube and all, in a composite material. When attaching a fibre optic sensor, it is important that the sensor will not be damaged by the mounting means, either when the cable is mounted or later during the operational life of the sensor. However, for strain sensors, it is also important that the sensor be sufficiently sensitive to strain on the component.

Figure 8:
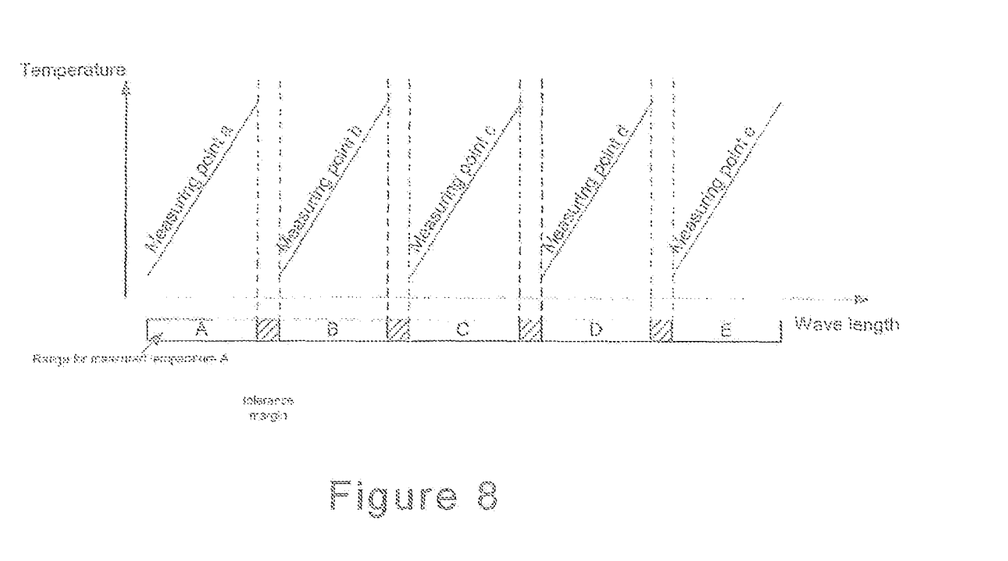
FIG. 8 illustrates the prior art wavelength allocation.

Present FBG sensors pose a number of disadvantages. In particular, in order to measure temperature, or strain, at a number of different locations a series of FBGs need to be used, each FBG being tuned to a different wavelength. In addition, the range of wavelengths that each FBG operates over need to be distinct from each other FBG's range of operating wavelengths. This is illustrated by way of example in FIG. 8. This is necessary to enable a single wavelength to relate to a specific FBG and a specific operating condition. Such systems require a broad band light source and a broad band interrogator, or a narrow band tunable light source, which results in significant overall cost of the system. LPGs suffer from similar problems.

We have appreciated that there is a need for a more cost effective solution for detecting temperature changes and/or deformation at multiple locations in a wind turbine component.

SUMMARY OF THE INVENTION

The invention is defined in the independent claims to which reference should be made. Advantageous features are set forth in the dependent claims to which reference should be made.

According to a first aspect of the present invention, there is provided an optical fibre sensor system for measuring at a plurality of locations an operating condition, the sensor comprising: a sensor optical fibre; a light source for inputting light into the sensor optical fibre; a light detector for receiving light from the sensor optical fibre; and a processor for outputting measurements of the operating condition corresponding to the plurality of locations based on light received at the light detector. The optical fibre sensor comprises a plurality of optical gratings, each grating in use being disposed at a respective location on the wind turbine component and arranged to operate over a respective range of wavelengths depending on variations in the operating condition. A first of the plurality of gratings is a master grating and is arranged to operate over a first wavelength range, the first wavelength range being distinct from a second range of wavelengths over which the other gratings are arranged to operate. The other gratings are arranged such that the respective wavelength ranges over which they operate are spaced apart from the first wavelength range by a respective predetermined interval and such that they overlap with the respective wavelength range of at least one of the other gratings. The processor is operable to determine the value of the operating condition at the location of the master grating from the wavelength value received in the first wavelength range, and to determine the value of an operating condition at the location of one of the other gratings based on the wavelength value received in the first wavelength range, a wavelength value received in the second wavelength range, and the predetermined intervals by which the overlapping ranges are spaced apart from one another.

The term "arranged to operate" as used herein means interact with light at a wavelength that falls within the allocated range of wavelengths and that varies within the range depending on variations in the operating condition".

By providing such an optical fibre sensor system, advantageously the cost of a sensor for measuring multiple operating conditions may be reduced. The cost may be reduced since the range of wavelengths that the light source, and the light detector, operate over can be reduced for the same number of measurements. Alternatively, advantageously, there may be an increase in the number of measurements that can be made for a given light source capable of emitting a fixed range of wavelengths.

Preferably, the light having a wavelength in the first wavelength range is uniquely indicative of the value of the operating condition at the location of the master grating.

Preferably, the processor is operable to determine a reference wavelength value for a first one of the other gratings, the reference value indicating for the first one of the other gratings, the wavelength in the grating's respective range of wavelengths that corresponds to the value of the operating condition measured at the master grating. In this case, the reference wavelength value for the grating is calculated by adding or subtracting the respective predetermined interval from the wavelength value received in the first wavelength range.

Preferably, the processor is operable to determine the value of the operating condition at the first one of the other gratings by determining the difference between the reference wavelength value for the grating and the closest received wavelength value.

Preferably, the amount by which the respective ranges of wavelengths of the other gratings overlap is such that for each of the other gratings there is a range of unambiguous wavelengths that are unique for that grating and a range of ambiguous wavelengths that overlap with the wavelengths of the adjacent grating.

The sensor system may also comprise a memory. In this case, the processor is operable to store a time series of measurements of wavelength in the memory for each of the other gratings, and the processor is operable to determine the value of the operating condition at the first one of the other gratings by determining the difference between the reference wavelength value and a received wavelength value falling in the ambiguous wavelengths for the first one of the other gratings, and by comparing the received wavelength value to historic values of the wavelength in the time series of measurements.

Preferably, the second wavelength range is divided into lower and upper second wavelength ranges, and the first range of wavelengths lies in between the lower and upper ranges.

Preferably, the first and second wavelength ranges are separated from one another by a margin of unused wavelengths.

According to a further aspect of the present invention, there is provided a method of operating an optical fibre sensor system, the system comprising a sensor optical fibre having a plurality of optical gratings, each grating in use being disposed at a respective measurement location and arranged to operate over a respective range of wavelengths depending on variations in an operating condition of the measurement location, the method comprising: allocating a first range of unique measurement wavelengths to a master grating in the optical fibre; allocating respective ranges of measurement wavelengths to further gratings in the optical fibre, wherein the ranges allocated to the further gratings are distinct from the first range of unique measurement wavelengths and separated from the first range by predetermined intervals, and wherein the ranges allocated to each of the further gratings overlap with at least one other of the further gratings; determining the value of the operating condition at the location of the master grating from a wavelength value received in the first range of unique measurement wavelengths; determining the value of an operating condition at the location of one of the other gratings based on the wavelength value received in the first wavelength range, a wavelength value received in the wavelength ranges allocated to the further gratings, and based on the predetermined intervals by which the overlapping ranges are spaced apart from one another.

Preferably, the method further comprises determining a reference wavelength value for a first one of the other gratings, the reference value indicating for the first one of the other gratings, the wavelength in the grating's respective range of wavelengths that corresponds to the value of the operating condition measured at the master grating, and the reference wavelength value for the grating is calculated by adding or subtracting the respective predetermined interval from the wavelength value received in the first wavelength range. More preferably, the method also comprises determining the value of the operating condition at the first one of the other gratings by determining the difference between the reference wavelength value for the grating and the closest received wavelength value.

Preferably, the amount by which the respective ranges of wavelengths of the other gratings overlap, such that for each of the other gratings there is a range of unambiguous wavelengths that are unique for that grating and a range of ambiguous wavelengths that overlap with the wavelengths of the adjacent grating.

Preferably, the method further comprises: storing a time series of measurements of wavelength in the memory for each of the other gratings, and determining the value of the operating condition at the first one of the other gratings by determining the difference between the reference wavelength value and a received wavelength value falling in the ambiguous wavelengths for the first one of the other gratings, and by comparing the received wavelength value to historic values of the wavelength in the time series of measurements.

Preferably, the second wavelength range is divided into lower and upper second wavelength ranges, and the first range of wavelengths lies in between the lower and upper ranges.

Preferably, the first and second wavelength ranges are separated from one another by a margin of unused wavelengths.

According to a yet further aspect of the present invention, there is provided a computer program product having computer code stored thereon which when executed on a processor causes the processor to carry out a method as described herein.

According to a still further aspect of the invention there is provided an optical fibre for a fibre optic sensor. The optical fibre comprises a first Fibre Bragg Grating adapted to operate over a first range of wavelengths, and at least one set of further Fibre Bragg Gratings adapted to operate over a second range of wavelengths. Each Fibre Bragg Grating within the set is adapted to operate over a portion of the second range of wavelengths. Furthermore, each Fibre Bragg Grating within the set has an operating range that partially overlaps with at least one other such Fibre Bragg Grating operating range. By providing an optical fibre with a set of Fibre Bragg Gratings with overlapping wavelength ranges, advantageously the cost of a sensor for measuring multiple operating conditions may be reduced. The cost may be reduced since the range of wavelengths that the light source, and the light interrogator, operate over can be reduced for the same number of measurements. Alternatively, there may be an increase in the number of measurements that can be made for a given light source capable of emitting a fixed range of wavelengths.

Preferably, the first range of wavelengths does not overlap with the second range of wavelengths. This enables the first grating to be used to unambiguously determine a range of expected operating conditions for the other gratings.

The optical fibre may also comprise a second set of further gratings adapted to operate over a third range of wavelengths. Each grating in the second set is adapted to operate over a portion of the third range, and each grating within the set has an operating range that partially overlaps with at least one other such grating operating range. Providing a second set of gratings enables more measurements to be made by a single optical fibre.

Preferably, the first range of wavelengths is between the second range and the third range. By providing the first range of wavelengths in the middle of the two other ranges of wavelengths, a single grating may be used to unambiguously determine two ranges of expected operating conditions, the first range for the first set of gratings and the second range for the second set of gratings.

According to a still further aspect of the present invention, there is provided a fibre optic sensor comprising at least one optical fibre as described herein. The fibre optic sensor also comprises a light source for feeding light into the at least one optical fibre, a light detector for detecting light that has travelled along the at least one fibre, and a controller for determining, from the detected light, the wavelengths of light interacting with the gratings. This arrangement allows the sensor to be implemented using only a small number of optical components, and therefore provides advantages in cost, installation and maintenance.

The invention extends to apparatus and/or methods substantially as herein described with reference to the accompanying drawings.

Any feature in one aspect of the invention may be applied to other aspects of the invention, in any appropriate combination. In particular, method aspects may be applied to apparatus aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

BRIEF DESCRIPTION OF THE DRAWINGS

Preferred embodiments of the invention will now be described, by way of example, and with reference to the drawings in which.

DETAILED DESCRIPTION OF PREFERRED EMBODIMENTS

Figure 1:
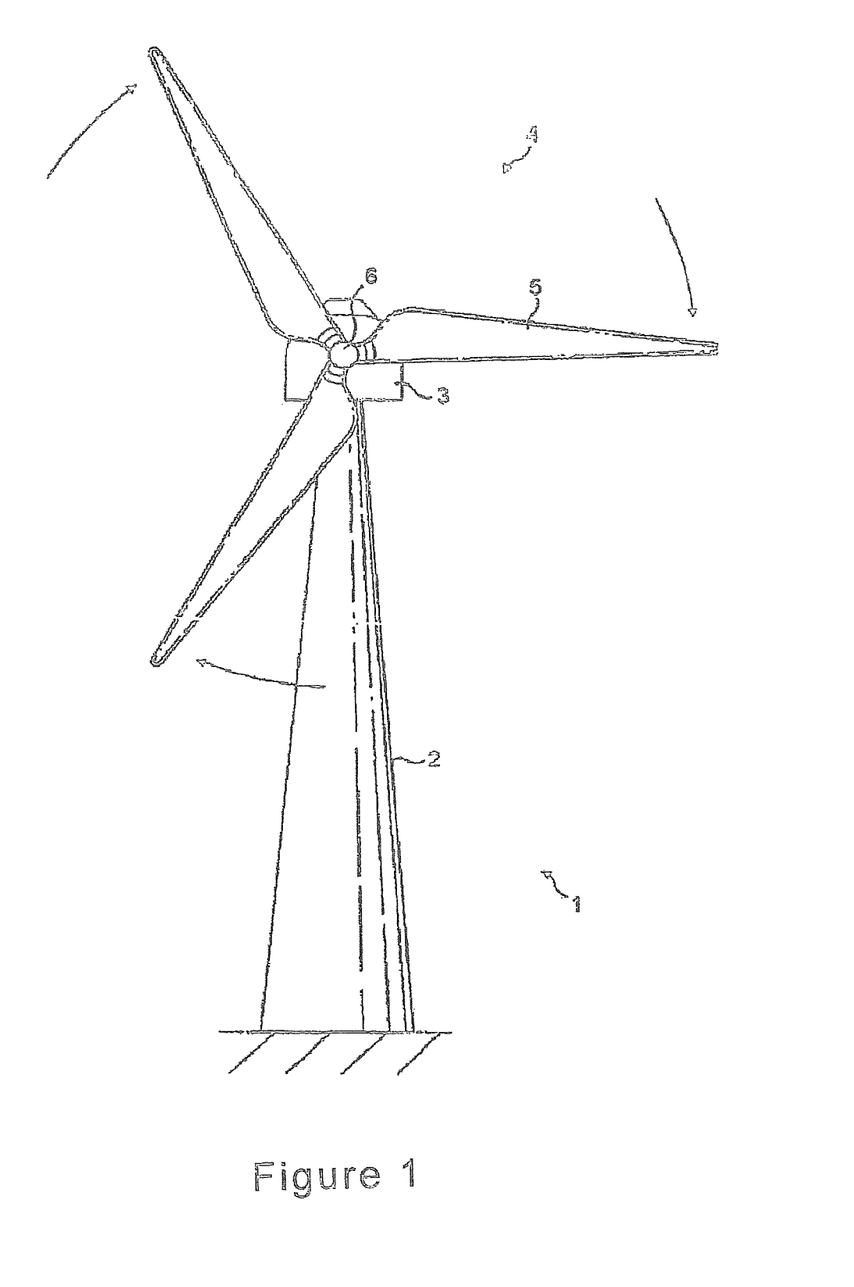
FIG. 1 illustrates a known wind turbine.

FIG. 1 illustrates a wind turbine 1, comprising a wind turbine tower 2 on which a wind turbine nacelle 3 is mounted. A wind turbine rotor 4 comprising at least one wind turbine blade 5 is mounted on a hub 6. The hub 6 is connected to the nacelle 3 through a low speed shaft (not shown) extending from the nacelle front. The wind turbine illustrated in FIG. 1 may be a small model intended from domestic or light utility usage, or may be a large model, such as those that are suitable for use in large scale electricity generation on a wind farm for example. In the latter case, the diameter of the rotor could be as large as 100 meters or more.

Figure 2:
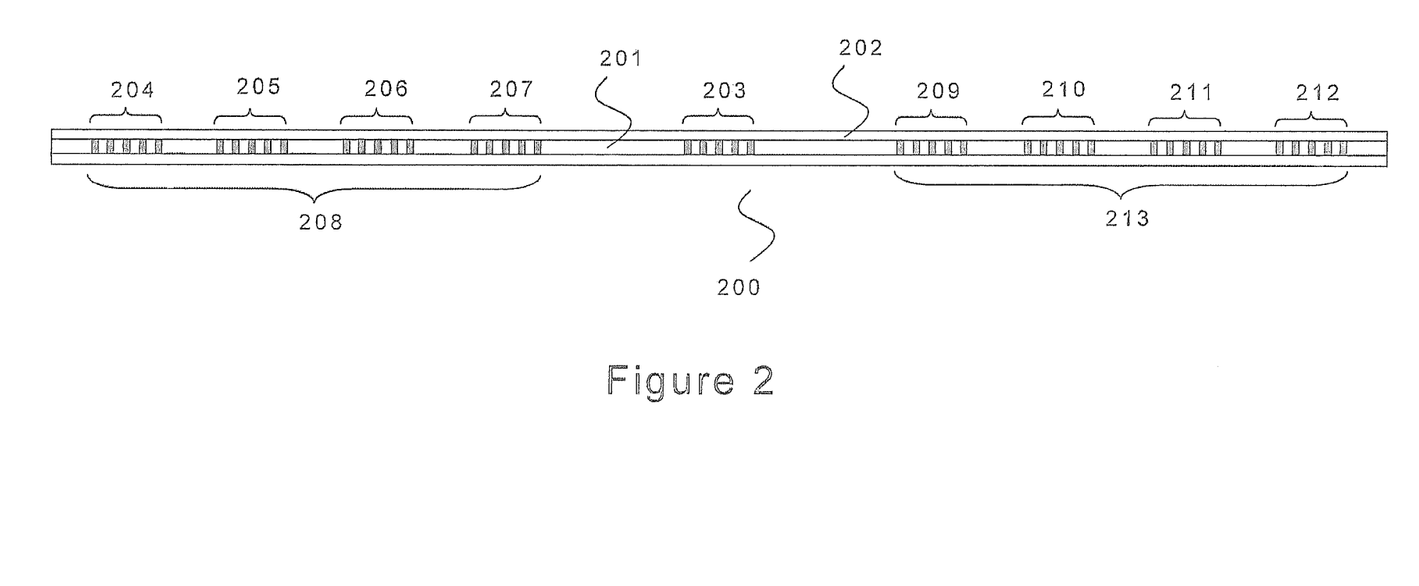
FIG. 2. illustrates an optical fibre according to the invention.

FIG. 2 illustrates one example of an optical fibre for use in an optical fibre sensor system according to the invention. Although in this example, the optical fibre described contains a plurality of gratings, it will be appreciated that the optical fibre according to the invention could be constructed with a plurality of LPGs, or indeed any other suitable wavelength-selective optical grating.

The optical fibre 200 comprises a fibre core 201, and a fibre cladding 202. The fibre core is provided with two sets of Fibre Bragg Gratings (FBGs) 203, 204, 205, 206 and 207 in FBG set 208, and FBGs 209, 210, 211, and 212 in FBG set 213. The FBG sets 208 and 213 correspond to FBGs A to D and F to I respectively in FIGS. 5(a) and 5(b), while FBG 203 corresponds to FBG E. Each FBG is tuned in the sense that it will reflect a different wavelength of light determined by the grating dimensions. If the section of the optical fibre 200 having an FBG is placed next to or in contact with a wind turbine component, then the changes in the length of the optical fibre at that location (for example, due to a temperature change of the component or a change in strain), will result in a change in both the dimensions of the FBG and the refractive index of the optical fibre. Both effects alter the wavelength of any light reflected and/or transmitted by the FBG, which can therefore be used as a measure of the temperature or strain of the component at that location.

Figure 3:
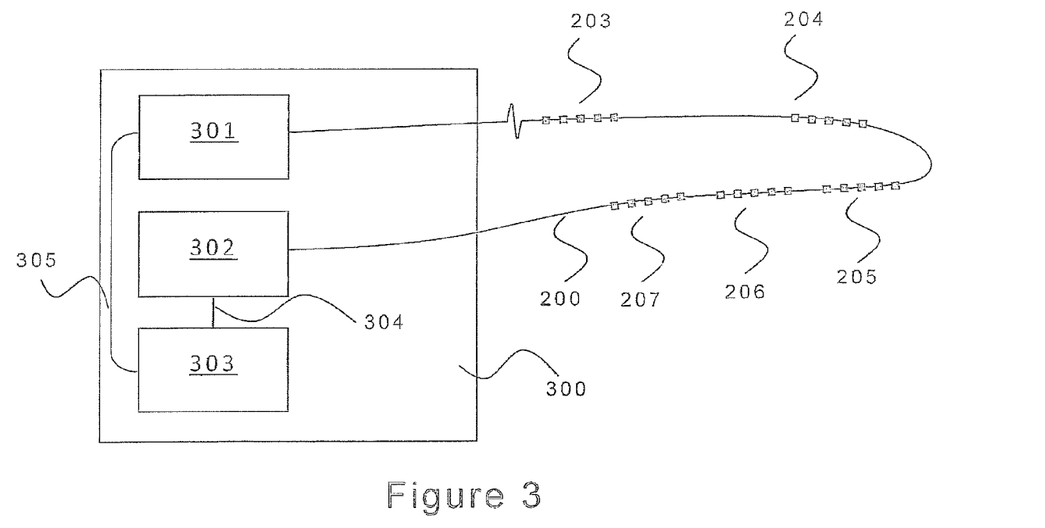
FIG. 3 illustrates an optical fibre sensor according to the invention.

FIG. 3 illustrates an embodiment of an optical fibre sensor system according to an example of the invention. The sensor 300 comprises a light emitting device 301, such as an LED, laser, halogen or metal halide source, a light collecting measuring device or detector 302, such as a photo-sensor, and an optical fibre 200 (for conciseness only FBG set 208 is shown). The light emitting device is connected to one end of the fibre optic cable to input light into the fibre, and the light measuring device (such as an interrogator) is connected to the other to receive light transmitted along the fibre. An interrogator is a light detector that detects and measures light across a wide spread of wavelengths. A controller 303 is connected to both light emitting device 301 and light measuring device 302, by connections 304 and 305, such as wires or cables. Components 301 to 305 may be housed in a mounting box, or the like, for easy attachment to the inside or outside of a wind turbine component.

Figure 4:
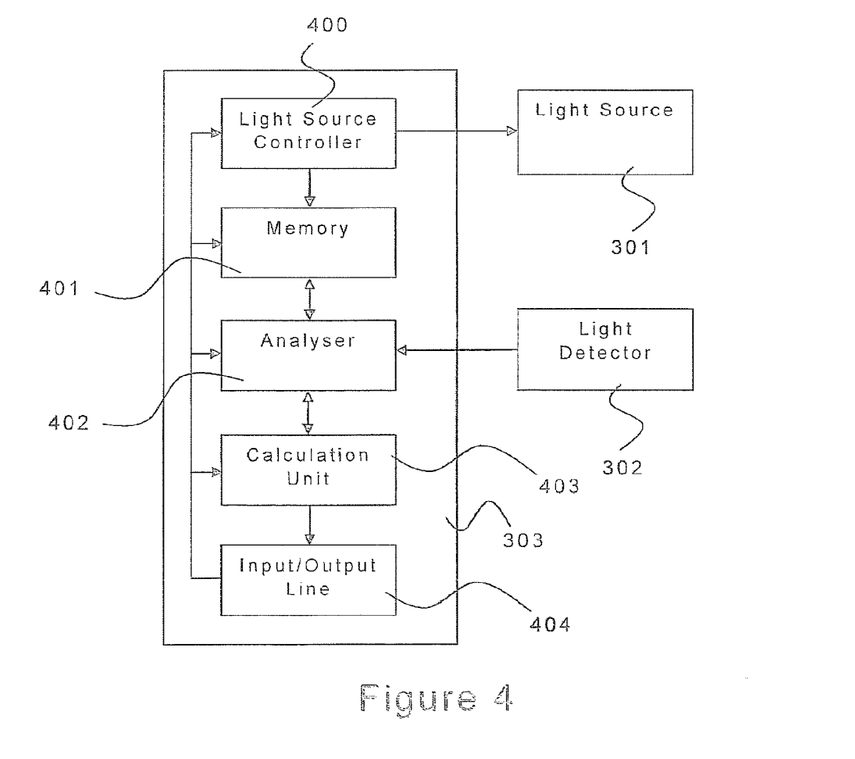
FIG. 4 illustrates a controller according to the invention.

FIG. 4 illustrates the controller 303 as described above with reference to FIG. 3. The controller comprises a light source controller 400, coupled to the light source 301. The light source controller is used to determine when the light source is operated.

The controller also comprises a memory 401 for storing the output received from the light detector. An analyser 402, such as a processor, and coupled to the memory, is provided to analyse the output from the light detector 302 stored in memory and determine the wavelengths of light reflected by the FBGs. There are two alternatives available for determining the wavelengths of light reflected by the FBGs. Either the wavelengths are measured directly by having the light detector 302 positioned at the same end of the optical fibre 200 as the light source 301, or by detecting the difference between the light profile provided by the light source, and the light received at the other end of the optical fibre.

A calculation unit 403 is coupled to the analyser 402 to calculate the difference between the wavelength received from each FBG and a reference wavelength expected if there were no temperature or strain difference, for example, between the FBGs (A, B, C or D) and FBG E. The calculation unit 403 is also coupled to the memory 401. The memory 401 is adapted to store a look-up table, and the look-up table is provided to allow the calculation unit to look-up the expected range of wavelengths for each FBG. The calculation unit then determines the value of the operating condition measured by FBG.

The controller further comprises an input/output line 404 for receiving and transmitting instructions or data to and from a remote site, such as a monitoring station. The input/output line may be wired or wireless.

Additionally, error detection can be incorporated into the controller 303. If no wavelength is detected within the expected range for a particular FBG, then this could be an indication of a fault. This could be the result of a breakdown in the coupling between the operating conditions being measured, or that the FBG itself is faulty.

Although the controller has been described in terms of separate hardware components, this is solely to illustrate the functionality of the controller in a clear manner. It would be possible in practice to provide the hardware components as software or hardware, or as any combination of single or combined components.

The optical fibre 200 is mounted on or in a wind turbine component (not shown in FIG. 3) to measure the strain in the component, or indeed any other suitable operating condition of the component, such as temperature. In one example, this may be achieved by mounts attached to the outside or inside surface of the component. Other mounting methods would be acceptable as would be known to the skilled person. If the sensor were to be installed in a wind turbine to measure the strain in the wind turbine blades, it is likely that the mounting box would be situated in the hub 6, and the optical fibre 200 would extend internally within the blade from the hub to the relevant region of the blade to be assessed. In this way, the aerodynamic properties of the blades are not affected by the presence of the sensor. In other locations, the optic fibre sensor may be mounted on the outside of the component.

The optical fibre sensor system described can therefore be utilised to measure a number of operating conditions, one operating condition per FBG. However, it is required that those operating conditions are coupled (i.e. that an increase in one operating condition results increase in the other operating conditions, and vice versa). For example, the operating conditions could be the temperature of a number of components housed within the electrical housing of a wind turbine since it would be expected that a rise in temperature of one component would lead to a rise in temperature of another component, and vice versa. The overall range of temperatures that could be measured can be large, for example from −40 degrees C. to 60 degrees C.

The operation of the optical fibre sensor system will now be described in more detail, and with reference to FIGS. 2, 5a and 5b. In this example, the use of the sensor to detect temperature only will be described. The operation of the sensor will be the same for other operating conditions that are to be measured. Furthermore, in this example, it is assumed that the FBGs are configured to reflect light back to the detector, rather than transmit light to a remote detector at the end of the optical fibre 200. In practice, either or both configurations are acceptable.

As shown in FIG. 2, optical fibre 200 comprises a number of FBG's A to I, each tuned to a different wavelength and each located at a different location on the component where measurements are to be taken. As shown in FIG. 5a, FBG E is tuned to a first default wavelength, lying in the middle of the range of wavelengths of light that can be transmitted along the optical fibre 200 and detected by the light detector 302.

Figure 5A:
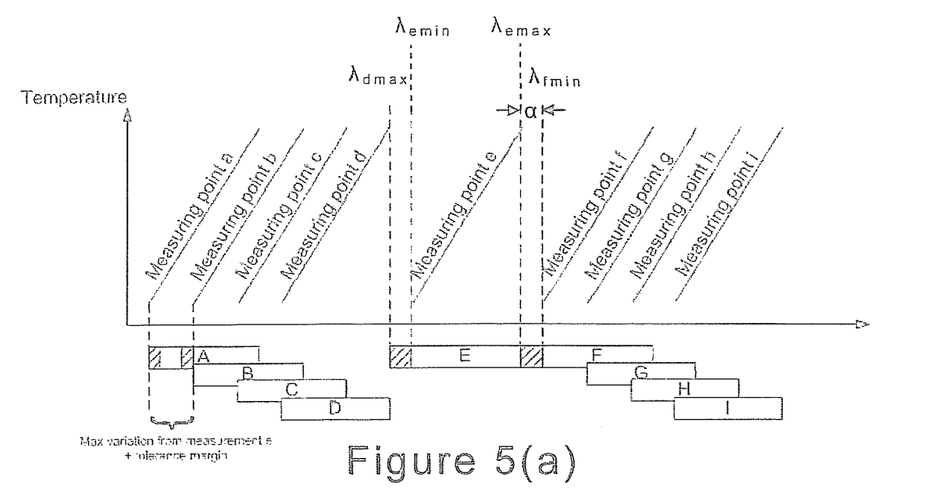
FIGS. 5(a) and 5(b) illustrate the wavelength ranges allocated to variations in temperature of an optical fibre according to the invention.

Also as shown in FIG. 5a, a first range of measurement wavelengths is allocated to FBG E for use, which corresponds to the range of temperatures that FBG E will be used to detect. In FIG. 5a, the range of wavelengths is illustrated as extending between $\lambda emin$ and $\lambda emax$, with $\lambda emid$ signifying the middle value of the range.

In practice, therefore, if the FBG E is required to detect temperatures in the range of say −40 to 60 degrees C., the FBG E will be constructed in the optical fibre 200 so that when the optical fibre 200 at FBG E is at −40 degrees C., the wavelength of light reflected by the FBG E will equal $\lambda emin$, and so that when the optical fibre 200 at FBG E is at 60 degrees C., the wavelength of light reflected by the FBG E will equal $\lambda emax$. Assuming linear variation of the FBG wavelength with temperature therefore FBG E will reflect light at $\lambda emid$ at 10 degrees. Using FBG sensors in this way is well known, and the appropriate wavelengths to correspond to the desired temperature can be calculated, read off product sheets for the optical fibre, or determined by simple experiment.

As shown in FIG. 5a, FBG E is allocated a unique and distinct range of wavelengths for the expected range of the operating parameter being measured. Thus, if a light signal is received having a wavelength in the range of $\lambda emin$ and $\lambda emax$, the controller 303 can unambiguously recognise that signal as being representative of the temperature of FBG E (and therefore the temperature of the component at that location) and no other. As the light signals from FBG E can always be detected unambiguously, FBG E shall be referred to as a calibration FBG.

Similarly, FBGs A to D and F to I are allocated respective ranges of wavelengths between $\lambda nmin$ and $\lambda nmax$ (where n is representative of A, B, C, D, F, G, H and I). It is assumed that each of the FBGs will operate over the same range of temperatures as FBG E, and in this example therefore, each FBG will be used to detected temperatures in the range −40 to 60 degrees C. but at different locations of the component. As above, each FBG will be constructed so that as the temperature of the FBG varies, the wavelength of light reflected varies between the maximum and minimum allotted wavelength values.

In the prior art example discussed above with reference to FIG. 8, each of the FBGs A to D and F to I would therefore require a unique range of operating wavelengths to be distinguished from one another and provide unambiguous temperature measurements in the manner described for FBG E. However in this case, as illustrated in FIG. 5a, the respective ranges of wavelengths of the FBGs A to D and F to I are overlapped with at least one adjacent FBG (excluding FBG E). This advantageously provides a reduction in the total range of wavelengths that must be accommodated by the fibre and the sensor system, but does mean that in certain scenarios the signals provided by each of the FBGs A to D and F to I are no longer unambiguous. As the ranges of adjacent wavelengths overlap with one another, it is possible that a light signal received from the optical fibre 200 corresponds to more than one possible value of temperature and location. Calibration FBG E is therefore used to determine the expected range of temperatures measured at FBGs A to D and FBGs F to I (this can be achieved as it assumed that the locations where the FBGs are located are thermally coupled, meaning that there will be some correspondence between temperatures at different locations) as well as distinguish the values of the different FBGs from one another. For this reason FBGs A to D and F to I will be referred to as subsidiary FBGs, to indicate their dependence on calibration FBG E.

As shown in FIG. 5a, FBG E is constructed to operate over wavelengths $\lambda emin$ to $\lambda emax$. FBGs A to D are allocated lower ranges of wavelengths in comparison to the range allocated to FBG E, while FBGs F to I are allocated higher ranges. In this example therefore the range of wavelengths allocated to FBGs D and F are adjacent to that allocated to FBG E. The minimum allocated wavelength of FBG F $\lambda fmin$ and the maximum allocated wavelength of FBG D λdmax are separated from the range for FBG E by a tolerance value α. This tolerance value is intended to accommodate any imprecision in the manufacturing technique and allow for possible deviations in the constructed wavelength of the respective FBGs.

Each allocated range of wavelengths will necessarily have a midpoint λnmid around which the range is centered. Taking the calibration FBG E initially, the maximum expected variation of wavelengths for FBG E is the range of wavelengths between the midpoint λemid and either λemin or λemax. In this example, the difference in the base wavelengths of each of the ranges for FBGs A to D or FBGs F to I (that is the difference between λamin and λbmin for example) is set to be this maximum variation for FBG E plus the tolerance alpha. This ensures that the overlapping ranges of wavelengths are not spaced out too much (in which case the reduction in bandwidth is diminished), but are also not too close together (in which case the accuracy of the sensor could be impaired).

Figure 5B:
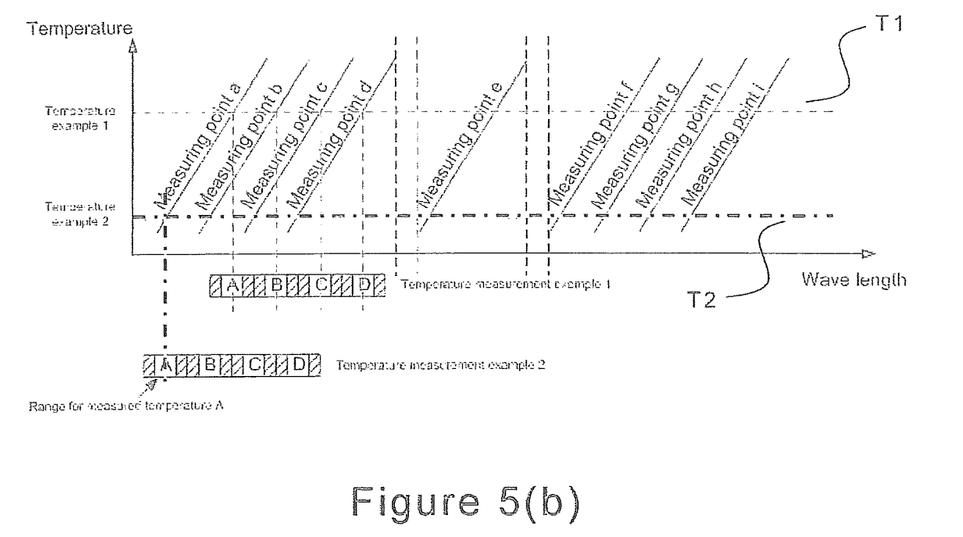

Referring now to FIG. 5b, it can be seen that this results in ranges of wavelengths that overlap, but that for each range of wavelengths there is a central portion that remains unambiguous, and overlapping portions where for the expected range of operating temperatures, a single wavelength could fall in the range of wavelengths allocated to both of two adjacent FBGs.

A number of different example modes of operation will now be explained, to illustrate how the controller 303 processes the light signals received from the optical fibre 200 and resolves any ambiguities between signals received from different FBGs.

In the first example, it is assumed that the temperature of the optical fibre 200 is the same at each of the different FBG locations A to I. Light source controller 400 instructs light source 301 to input light into the optical fibre 200, and as a result light is reflected back from each of the FBGs A to I and is detected at light detector 302. Analyser 402 scans through the nine signals received from the respective FBGs A to I to detect the signal reflected back by calibration FBG E. The signal from FBG E can be distinguished from the other FBGs as (assuming the temperature of the component has not gone outside of the expected range of temperatures) it will always lie in the dedicated range of unique wavelengths λemin or λemax. From the measurement λe the temperature of the component at location E can be determined by analyser 402 and calculation unit 403. This value will also be stored in memory 401 with a time stamp information. Referring to FIG. 5b, this first temperature is denoted as T1.

As the relationship between the wavelength ranges of FBG E and FBGs A to D and F to I is known, the wavelength of the light signals reflected by the FBGs A to D and F to I when those FBGs are all at the same temperature can be calculated by the analyser and calculation unit 403. The wavelength of light that corresponds to the same temperature as the FBG E shall be referred to as the reference wavelength for the FBG (it will be appreciated that this will vary with variations in temperature).

As the size of the wavelength range is the same for each FBG, the difference in expected wavelengths between FBGs E and D at the same temperature can be given by the difference in the centre of the ranges (λemid−λdmid) for example (the minimum or maximum values of the ranges could also be used). Similarly, the difference in expected wavelengths between FBGs E and C at the same temperature can be given by the difference in the centre of the ranges (λemid−λcmid) for example (again the minimum or maximum values of the ranges could also be used). Thus, as shown in FIG. 5b, once the value of T1 is determined absolutely from FBG E, the wavelengths for the same temperature T1 at each of the different locations A to D and F to I can be readily determined by subtraction or addition of a respective predetermined interval. This interval will be different for each FBG range, and may be measured relative to the adjacent FBG range or to the range of wavelengths for FBG E.

Figure 6A:
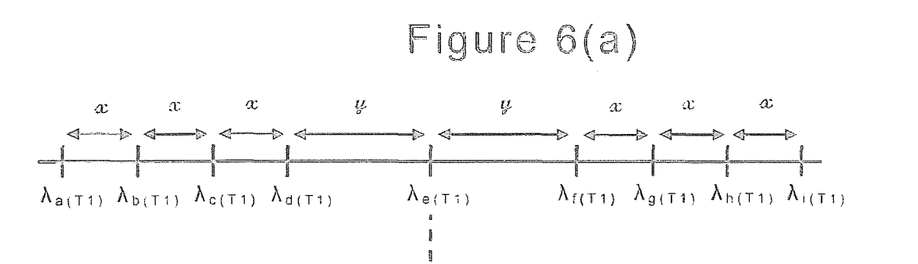
FIGS. 6(a) and 6(b) illustrate sample wavelength outputs for two uniform but different temperatures.
Figure 6B:
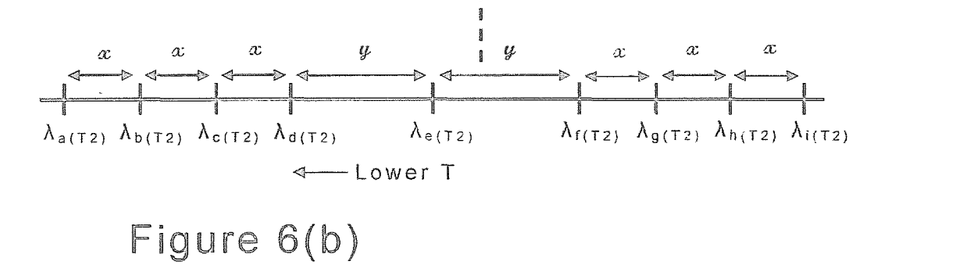

Further, as shown in FIG. 5b, it will be appreciated that assuming the optical fibre is uniformly disposed at a second lower temperature T2, the respective wavelengths of the signals reflected back by the FBGs in this case will be lower, but that the interval between the respective wavelengths will be the same in both cases. This is illustrated in FIGS. 6a and 6b for temperatures T1 and T2. In use therefore, if the analyser 402 and calculation unit 403, having determined the temperature at E also determine the regular spacing of wavelengths indicated in FIGS. 6a and 6b it can deduce that the optical fibre is at a uniform temperature.

In FIG. 5b, the horizontal bars A, B C and D underneath the wavelength axis indicate how the ranges of wavelengths that can be detected at the FBGs A to D will change with temperature. As the temperature at FBG E varies the other FBG's usable measurement range of wavelengths slides up or down the wavelengths available. For temperature T1 for example the analyser 402 and calculation unit 403 assume that each of the FBGs A to D are operating in the unshaded unambiguous wavelength range indicated directly underneath the wavelength axis. For, temperature T2, those ranges of unambiguous wavelengths are shifted down. Due to the assumed thermal coupling between FBG E and the other FBGs, once the temperature at FBG E is determined, the expected operating range at the other subsidiary FBGs can be readily determined.

Figure 7:
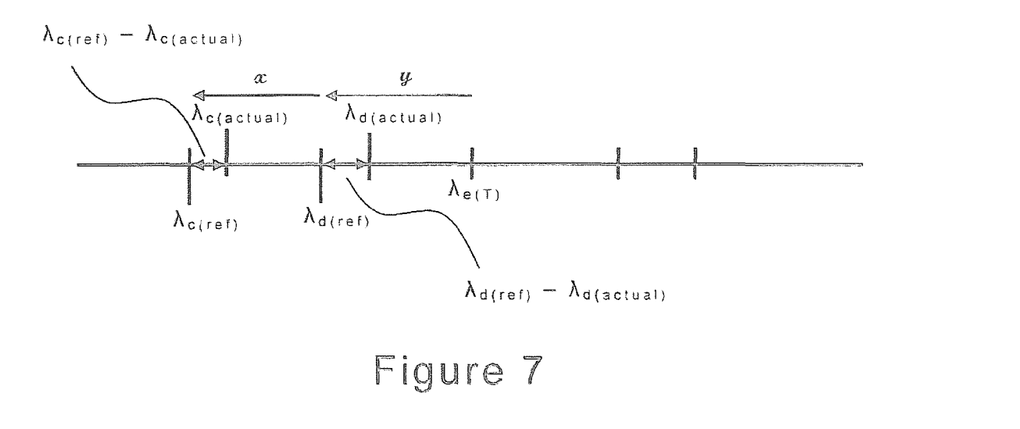
FIG. 7 illustrates sample wavelength outputs for the case where the local temperatures are different.

In practice, the temperature at the locations being monitored by the other FBGs A to D and I to F will not be identical to FBG E, and the signals reflected back to the light detector 302 and the analyser 402 will not exhibit the regular spacing illustrated in FIGS. 6a and 6b, but will be spaced irregularly as shown in FIG. 7. In this case, the irregular spacing is indicative of the temperature differences at each location. To determine the actual temperature of each of the FBGs, the calculation unit therefore determines the difference between the reference wavelength (referred to as λn_ref) of FBG n, assuming that FBG n is at the same temperature as FBG E, and the actual signal that is detected from FBG n. λn_ref is calculable once Te is known, as explained above, and calculating the difference to give a temperature reading at FBG n is therefore simply a matter of subtraction or addition as shown in FIG. 7.

This case assumes that the actual wavelengths reflected back from the various FBGs all lie in the unshaded ranges of FBG wavelengths illustrated in FIG. 5b. These unshaded wavelengths are unambiguous as once they are calibrated with respect to FBG E, it is possible to assume to a high degree of confidence that a received signal in that range was reflected from a particular FBG and no other. It will be appreciated for example that if the light signal falling into that wavelength range had in fact been reflected by the FBG (n+1/n−1) adjacent to the expected FBG n, it would indicate a very great deviation in temperature at the adjacent FBG from that which is expected. This is unlikely given the requirement that the FBG locations be thermally coupled.

Where signals received from the optical fibre 200 lie in the shaded region on the wavelength axis, the sensor system has two choices. In one implementation, the system simply disregards the sensor readings and gives an error message indicating that the received light signal wavelength no longer indicates an unambiguous wavelength but instead indicates one of at least two temperatures depending on which of the FBGs are believed to reflected the signal. Alternatively, the analyser 402 can process the signal falling into the shaded ambiguous wavelength regions and see if the originating FBG (and therefore the correct temperature and location can be determined). This can be achieved in a number of ways.

First, the sensor system is configured to record the temperature and wavelength indications continuously over time. In this way, a received wavelength that falls in the shaded ambiguous portion of the wavelength axis can be compared against the received wavelengths for the immediately preceding time intervals. Assuming that historic values of the received wavelength originated in the unshaded region of the wavelength axis and then drifted into the shaded ambiguous region as the temperature changed, potentially ambiguous wavelength values can be resolved simply be inspection and comparison of previous values. This does however assume that the wavelengths are sampled often enough for successive values to be relatable to one another.

In a more simple configuration, the analyser may simply assume that wavelength values in the ambiguous region of the wavelength range belong to the unambiguous FBG wavelength range to which they are closest. This introduces more room for error, but does mean that the analysis and processing overhead of the sensor is less. In practice, using the wavelength values in the ambiguous regions of the wavelength axis will be desirable or unnecessary depending on the degree of overlap between the adjacent ranges. It will be appreciated that taking the wavelength value that is closest to the reference value occurs ordinarily when the wavelength that is received lies in the unambiguous range of wavelengths. Operating based on the closest wavelength therefore allows the system to disregard the distinction between the unambiguous and ambiguous ranges altogether.

Similarly, it will be appreciated that the dedicated range of wavelengths of FBG E may overlap by a small amount (for example, by an amount less than the overlap of the wavelength ranges allocated to FBGs A and B). Again, because it is assumed that the FBG locations are thermally coupled, even when the measured wavelength for FBG E lies in a range that is also allocated to FBG D (or FBG F) by analysing the wavelengths of light reflected by the other FBGS the temperature at FBG can be unambiguously determined.

The invention has been described with reference to example implementations, purely for the sake of illustration. The invention is not to be limited by these, as many modifications and variations would occur to the skilled person. The invention is to be understood from the claims that follow.

Each feature disclosed in the description, and (where appropriate) the claims and drawings may be provided independently or in any appropriate combination.

What is claimed is:

1. An optical fibre sensor system for measuring an operating condition at a plurality of locations, the sensor system comprising:
    a sensor optical fibre;
    a light source for inputting light into the sensor optical fibre;
    a light detector for receiving light from the sensor optical fibre; and
    a processor for outputting measurements of the operating condition corresponding to the plurality of locations based on light received at the light detector;
    wherein the sensor optical fibre comprises a plurality of optical gratings, each optical grating in use being disposed at a respective location and arranged to operate over a respective range of wavelengths depending on variations in the operating condition;
    wherein a first of the plurality of optical gratings is a master grating and is arranged to operate over a first wavelength range, the first wavelength range being distinct from a second wavelength range over which other optical gratings of the plurality of optical gratings are arranged to operate, and
    wherein the other optical gratings are arranged such that the respective wavelength ranges over which the other optical gratings operate are spaced apart from the first wavelength range by a respective predetermined interval and such that the respective wavelength range of each of the other optical gratings overlaps the respective wavelength range of at least one other of the other optical gratings;
    wherein the processor is operable to determine a value of the operating condition at the location of the master grating based on a first wavelength value received in the first wavelength range, and to determine a value of the operating condition at the location of a first one of the other optical gratings based on the first wavelength value, a second wavelength value received in the second wavelength range, and predetermined intervals by which the overlapping wavelength ranges are spaced apart from one another.

2. The sensor system of claim 1, wherein the received light having a wavelength value in the first wavelength range is uniquely indicative of the value of the operating condition at the location of the master grating.

3. The sensor system of claim 1, wherein the processor is further operable to determine a reference wavelength value for the first one of the other optical gratings,
    the reference wavelength value indicating, for the first one of the other optical gratings, a wavelength in the optical grating's respective range of wavelengths that corresponds to the value of the operating condition measured at the master grating, and
    wherein the reference wavelength value for the first one of the other optical gratings is calculated by adding or subtracting a respective predetermined interval from the wavelength value received in the first wavelength range.

4. The sensor system of claim 3, wherein the processor is further operable to determine the value of the operating condition at the first one of the other optical gratings by determining a difference between the reference wavelength value for the first one of the other optical gratings and a closest received wavelength value.

5. The sensor system of claim 1, wherein an amount by which the respective wavelength ranges of the other optical gratings overlap is such that each of the wavelength ranges comprises a range of unambiguous wavelengths that are unique to the respective other optical grating and a range of ambiguous wavelengths that overlap with the wavelength range of an adjacent optical grating of the other optical gratings.

6. The sensor system of claim 5, further comprising a memory,
    wherein the processor is further operable to determine a reference wavelength value for the first one of the other optical gratings, the reference wavelength value indicating, for the first one of the other optical gratings, a wavelength in the optical grating's respective range of wavelengths that corresponds to the value of the operating condition measured at the master grating,
    wherein the processor is further operable to store a time series of wavelength measurements in the memory for each of the other optical gratings, and wherein the processor is further operable to determine the value of the operating condition at the first one of the other optical gratings by determining a difference between the reference wavelength value and a received wavelength value falling in the range of ambiguous wavelengths for the first one of the other optical gratings, and by comparing the received wavelength value to historic values included in the time series of wavelength measurements.

7. The sensor system of claim 1, wherein the second wavelength range comprises lower and upper second wavelength ranges, and wherein the first wavelength range is between the lower and upper second wavelength ranges.

8. The sensor system of claim 1, wherein the first and second wavelength ranges are separated from one another by a margin of unused wavelengths.

9. The sensor system of claim 1, wherein each of the plurality of optical gratings is one of a Fibre Bragg Grating and a Long Period Fibre Grating.

10. The sensor system of claim 1, wherein the operating condition is one or more of temperature, strain, deformation, and pressure.

11. The sensor system of claim 1, wherein the plurality of locations are respective locations on a wind turbine component.

12. A method of operating an optical fibre sensor system comprising a sensor optical fibre having a plurality of gratings, each grating in use being disposed at a respective measurement location and arranged to operate over a respective range of wavelengths depending on variations in an operating condition at the measurement location, the method comprising:
   allocating a first range of unique measurement wavelengths to a master grating of the plurality of gratings in the sensor optical fibre;
   allocating respective ranges of measurement wavelengths to further gratings of the plurality of gratings in the sensor optical fibre, wherein the ranges allocated to the further gratings are distinct from the first range of unique measurement wavelengths and separated from the first range by predetermined intervals, and wherein the respective range allocated to each of the further gratings overlaps with the range of at least one other of the further gratings;
   determining a value of the operating condition at the measurement location of the master grating based on a first wavelength value received in the first range of unique measurement wavelengths; and
   determining a value of the operating condition at the measurement location of a first one of the further gratings based on the first wavelength value, a second wavelength value received in the ranges allocated to the further gratings, and predetermined intervals by which the overlapping ranges of measurement wavelengths are spaced apart from one another.

13. The method of claim 12, further comprising: determining a reference wavelength value for a first one of the further gratings, the reference wavelength value indicating, for the first one of the further gratings, a wavelength in the grating's respective range of wavelengths that corresponds to the value of the operating condition measured at the master grating, and
   wherein the reference wavelength value for the first one of the further gratings is calculated by adding or subtracting a respective predetermined interval from the wavelength value received in the first wavelength range.

14. The method of claim 13, further comprising: determining the value of the operating condition at the first one of the further gratings by determining a difference between the reference wavelength value for the first one of the further gratings and a closest received wavelength value.

15. The method of claim 12, wherein an amount by which the respective measurement wavelength ranges of the further gratings overlap is such that each of the measurement wavelength ranges comprises a range of unambiguous wavelengths that are unique to the respective further grating and a range of ambiguous wavelengths that overlap with measurement wavelength range of an adjacent grating of the further gratings.

16. The method of claim 12, further comprising:
   storing a time series of wavelength measurements in memory for each of the further gratings; and
   determining the value of the operating condition at the first one of the further gratings by determining a difference between the reference wavelength value and a received wavelength value falling in the range of ambiguous wavelengths for the first one of the further gratings, and by comparing the received wavelength value to historic values included in the time series of wavelength measurements.

17. The method of claim 12, wherein the ranges of measurement wavelengths allocated to the further gratings are divided into lower and upper second wavelength ranges, and wherein the first range of unique measurement wavelengths is between the lower and upper second wavelength ranges.

18. The method of claim 12, wherein the first range of unique measurement wavelengths and the ranges of measurement wavelengths allocated to the further gratings are separated from one another by a margin of unused wavelengths.

19. The method of claim 12, wherein each of the plurality of gratings is one of a Fibre Bragg Grating and a Long Period Fibre Grating.

20. The method of claim 12, wherein the operating condition is one or more of temperature, strain, deformation, and pressure.

21. The method of claim 12, wherein the measurement locations of the master grating and the first one of the further gratings are respective locations on a wind turbine component.

22. A non-transitory computer program product having computer code stored thereon which when executed on a processor causes the processor to carry out an operation in a system comprising a sensor optical fibre having a plurality of gratings, each grating in use being disposed at a respective measurement location and arranged to operate over a respective range of wavelengths depending on variations in an operating condition at the measurement location, the operation comprising:
   allocating a first range of unique measurement wavelengths to a master grating of the plurality of gratings in the sensor optical fibre;
   allocating respective ranges of measurement wavelengths to further gratings of the plurality of gratings in the sensor optical fibre, wherein the ranges allocated to the further gratings are distinct from the first range of unique measurement wavelengths and separated from the first range by predetermined intervals, and wherein the respective range allocated to each of the further gratings overlaps with the range of at least one other of the further gratings;
   determining a value of the operating condition at the measurement location of the master grating based on a first wavelength value received in the first range of unique measurement wavelengths; and determining a value of the operating condition at the measurement location of a first one of the further gratings based on the first wavelength value, a second wavelength value received in the ranges allocated to the further gratings, and predetermined intervals by which the overlapping ranges of measurement wavelengths are spaced apart from one another.

23. An optical fibre for a fibre optic sensor, the optical fibre comprising:
a first grating adapted to operate over a first range of wavelengths; and
a first set of further gratings adapted to operate over a second range of wavelengths, each grating of the first set being adapted to operate over a portion of the second range,
each grating of the first set having an operating range that partially overlaps with the operating range of at least one other grating of the first set.

24. The optical fibre of claim 23, wherein the first range of wavelengths and the second range of wavelengths are non-overlapping.

25. The optical fibre of claim 23, further comprising a second set of further gratings adapted to operate over a third range of wavelengths, each grating of the second set being adapted to operate over a portion of the third range, each grating of the second set having an operating range that partially overlaps with the operating range of at least one other grating of the second set.

26. The optical fibre of claim 25, wherein the first range of wavelengths is between the second range and the third range.

* * * * *